United States Patent [19]
Beck et al.

[11] Patent Number: 5,614,148
[45] Date of Patent: Mar. 25, 1997

[54] ONE PIECE SELF-STANDING BLOW MOLDED PLASTIC CONTAINERS MADE FROM A MONOBASE PREFORM

[75] Inventors: Martin H. Beck; George F. Rollend, both of Amherst; John H. Muszynski, Auburn; Lydia K. Reed, Amherst; Scott J. Hickey, Hollis; Dennis C. Connor, Merrimack; Robert Caldicott, Nashua, all of N.H.

[73] Assignee: DTL Technology Limited Partnership, Amherst, N.H.

[21] Appl. No.: 380,647

[22] Filed: Jan. 30, 1995

[51] Int. Cl.$^6$ .................... B29C 49/06; B29D 23/00
[52] U.S. Cl. .................. 264/532; 264/537; 215/375; 428/36.92; 428/542.8
[58] Field of Search .................... 264/532, 537, 264/523; 215/375; 220/606; 428/36.92, 542.8

[56] References Cited

U.S. PATENT DOCUMENTS

| | | |
|---|---|---|
| 3,759,410 | 9/1973 | Uhlig . |
| 4,108,324 | 8/1978 | Krishnakumar et al. . |
| 4,247,012 | 1/1981 | Alberghini . |
| 4,254,882 | 3/1981 | Yoshino . |
| 4,403,706 | 9/1983 | Mahajan . |
| 4,525,401 | 6/1985 | Pocock et al. . |
| 4,725,464 | 2/1988 | Collette . |
| 4,863,046 | 9/1989 | Collette et al. . |
| 4,892,205 | 1/1990 | Powers et al. . |
| 4,927,680 | 5/1990 | Collette et al. . |
| 4,978,015 | 12/1990 | Walker . |
| 5,104,706 | 4/1992 | Krishnakumar et al. . |
| 5,160,059 | 11/1992 | Collette et al. . |
| 5,353,954 | 10/1994 | Steward et al. . |
| 5,427,258 | 6/1995 | Krishnakumar et al. . |

FOREIGN PATENT DOCUMENTS

91/00139  1/1992  Australia .

*Primary Examiner*—Catherine Timm
*Attorney, Agent, or Firm*—Davis and Bujold

[57] ABSTRACT

The invention provides a light weight self-standing blow molded two liter carbonated beverage bottle having a unique petaloid base made from a monobase preform. The base comprises a petaloid design which has a plurality of at least three (preferably five) feet. The monobase preform has a thick reinforcing ring forming portion which remains unstretched during blowing. The reinforcing ring forming portion is thicker than both the sidewall forming portion and the gate area forming portion of the preform thereby resulting in increased stretching in both those areas. The reinforcing ring extends circumferentially around the base. By providing such a reinforcing ring, a bottle having a bigger foot radius and/or containing less material use can be realized. The resulting bottle has less stress whitening and greater stress crack resistance while at the same time using less material and/or having a larger radius than prior bottles.

10 Claims, 5 Drawing Sheets

ONE PIECE SELF-STANDING BLOW MOLDED PLASTIC CONTAINERS MADE FROM A MONOBASE PREFORM

The present invention relates to plastic containers for containing fluids under pressure and the methods of producing same and, more particularly, to a one-piece disposable plastic bottle of the petaloid base variety having a reinforcing ring and a stretched gate area. The monobase preform has a reinforcing ring forming portion. The reinforcing ring forming portion is thicker than at least the sidewall forming portion and also, usually, the gate area forming portion. The reinforcing ring extends circumferentially around the base. By providing such a reinforcing ring, a bottle base having a bigger foot radius and/or using less material can be realized. The resulting bottle has less stress whitening in the foot area and greater stress crack resistance.

BACKGROUND OF THE INVENTION

Blow molded plastic bottles have largely replaced the heavier glass bottles previously used for soft drinks, and the like. In a two liter bottle of plastic, the weight of the bottle itself is negligible as compared to the weight of a glass bottle of similar capacity. The first plastic bottles were generally two piece bottles comprising a pressure vessel portion and base which permitted the bottle to stand upright on shelves, and the like. The pressure vessel portion was typically of a tough, flexible plastic (e.g. polyester) which became resiliently rigid for gripping due to the internal pressure created by the carbon dioxide gas in the soft drink liquid contained therein. The bottom was hemispherical and the separate base was required in order for the bottle be able to stand by itself. The base was typically of a plastic such as polyethylene and is attached over the bottom of the pressure vessel portion with adhesive.

One alternative to a two-piece construction is to create a bottle having a so-called "champagne" base which resists the internal pressure. Inversion is a problem in such designs. In an attempt to avoid that problem, numerous bottle configurations have been proposed incorporating, for example, integral pressure-resistant ribs into the bottom of the bottle. Other prior art approaches are those disclosed in the inventor's own U.S. Pat. Nos. 4,780,257; 4,889,752; 4,927,679 which relate to a container having an annular peripheral chime surrounding an inward sloping base portion for resisting inversion of the base, caused by internal pressure, comprising an integral reinforcing ring incorporated into the base and running horizontally in the hoop direction. This reinforcing ring is placed in a location within the base to oppose inversion of the base.

More recently, bottle designs utilizing a petaloid base have been proposed. In all polyester (usually PET) bottles, weight is a very important consideration. Based on a conservative estimate of 5 billion bottles produced per year and a PET price of $(US) 1.54 per Kg ($(US) 0.70 per pound), a 1–2 gram decrease in the PET content of a bottle will save approximately $(US) 7–14 million per year.

OBJECT OF THE INVENTION

It is an object of the present invention to provide a construction for the base of a one piece plastic bottle for containing carbonated beverages which is of the petaloid type providing a larger support radius and/or using less material than prior art designs.

It is a further object of the present invention to provide a method for the blow molding of a light-weight one piece plastic bottle for containing carbonated beverages from a preform having a thickened annular region at the transition between its sidewall forming portion and its closed end.

SUMMARY OF THE INVENTION

According to the invention there is provided a blow molding process for producing a self-standing one-piece polyester container for carbonated beverages defining a longitudinal axis and comprising a sidewall portion which is integral with and terminates in a closed base of a petaloid form defining at least three feet disposed about the longitudinal axis whereby the container is self standing, each said foot being defined by a support pad and sloping walls extending therefrom to radially extending straps disposed between adjacent pairs of feet, each said strap extending from a gate area, centered on said longitudinal axis, along a curve toward an extended portion adjacent said side wall; and, a reinforcing ring located on said curve between said gate area and said extended portion and extending around said base through said feet, adjacent sloping walls and said straps, the method comprising the steps of a) forming a hollow preform comprising a sidewall forming portion of constant wall thickness material along the length thereof for forming a constant thickness sidewall portion of the container and terminating, at a transition, in a closed base forming portion, a reinforcing ring forming portion being located at the transition between the sidewall forming portion and the base forming portion, said reinforcing ring forming portion having a wall thickness greater than the wall thickness in the sidewall forming portion; b) temperature conditioning the preform; c) positioning the preform in a blow mold cavity defining the finished container shape and having a neck finish engaging top and a base forming bottom; d) inserting a stretch rod into the preform; e) extending the stretch rod within the cavity to move the bottom of the preform toward the bottom of the blow mold cavity to longitudinally stretch the material in at least the sidewall forming portion such that the preform extends from the top to adjacent the bottom of the blow mold cavity; and, f) injecting pressurized gas into the preform whereby the preform is radially stretched outwardly to fill the blow mold cavity and to form the container with the material of the reinforcing ring located to extend through said feet, adjacent sloping walls and said straps.

According to the invention there is also provided a self-standing polyester container for carbonated beverages defining a longitudinal axis and comprising a sidewall portion which is integral with and terminates in a closed base of a petaloid form defining at least three feet disposed about the longitudinal axis whereby the container is self standing, each said foot being defined by a support pad and sloping walls extending therefrom, said feet being disposed about said longitudinal axis, said base having radially extending straps disposed between adjacent pairs of feet, each said strap extending from a gate area, centered on said longitudinal axis, along a curve toward an extended portion adjacent said side wall; and, a reinforcing ring located on said curve between said gate and said extended portion and extending circumferentially around said base through said feet, adjacent sloping walls and said straps.

BRIEF DESCRIPTION OF THE DRAWINGS

The invention will now be described, by way of example, with reference to the accompanying drawings, in which.

DETAILED DESCRIPTION OF THE INVENTION

Briefly, the base of the preferred form of the container of the present invention comprises a petaloid design for a bottle which has a plurality of at least three (preferably five) feet evenly disposed around the longitudinal axis of the bottle and projecting from a hemispherical base form of the bottle to provide a stable self-standing support for the bottle. Between each adjacent pair of feet is a radially extending valley, the valley floor of which is preferably curved in cross-section. The valley floor generally follows the hemispherical base shape and opens to an extended portion of that base shape lying radially outwardly of the feet.

Figure 1:
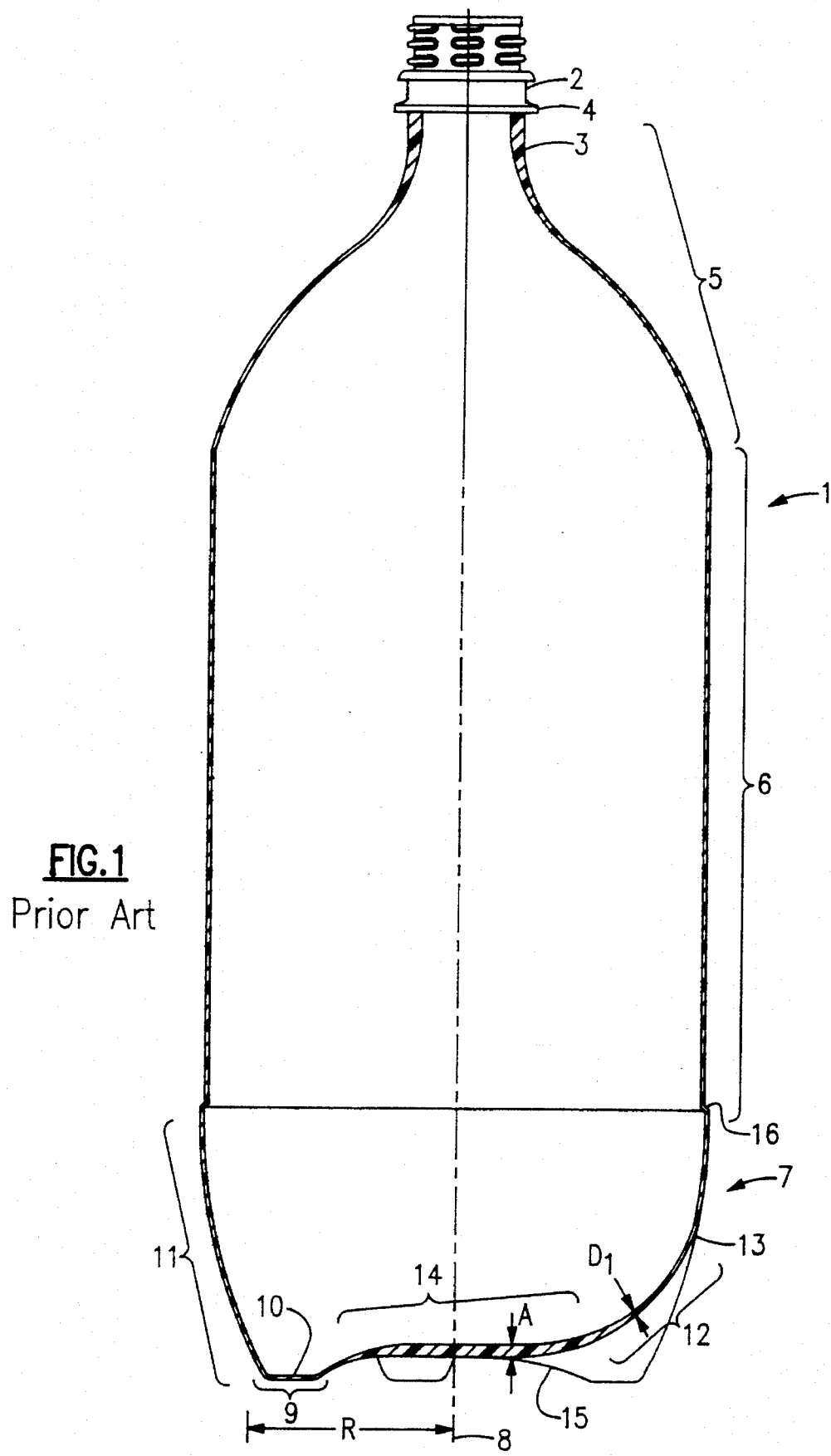
FIG. 1 is a partially sectioned view taken along line 1—1 of FIG. 2 of a prior art bottle having a petaloid base.
Figure 2:
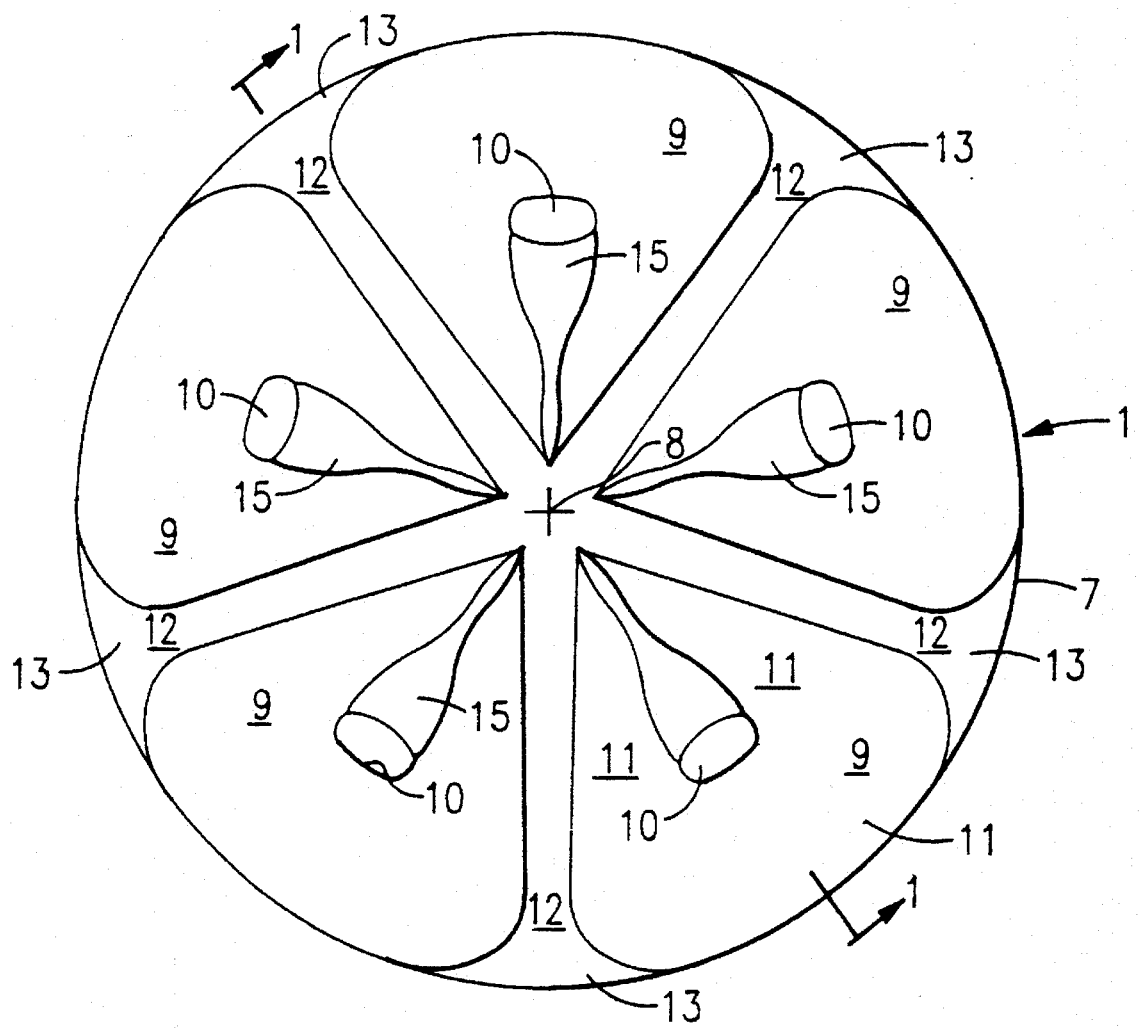
FIG. 2 is a bottom view of the petaloid base of a prior art bottle.

Referring first to FIGS. 1 and 2, a prior art one piece self-standing bi-axially oriented PET two liter bottle 1, of circular horizontal cross-section, comprises a neck finish 2 connected to a neck transition portion 3 by way of a neck support ring 4. The neck transition portion 3 connects by way of an upper portion 5 of the bottle to a substantially cylindrical sidewall portion 6 which terminates at its lower end in a closed base 7, the underlying shape of which is hemispherical. The bottle 1 defines a longitudinal axis 8.

Projecting downwardly from the hemispherical form of the base are five hollow feet 9 which together form a petaloid foot formation with the feet symmetrically and evenly disposed about the longitudinal axis 8 to provide the stable support for the bottle necessary to provide its self-standing ability. The lowest extensions of the feet 9 terminate in bottle support pads 10. Each foot 9 comprises sloping walls 11 extending from its pad 10 to its junction with the underlying hemispherical formation (reference numbers for sloping walls 11 are included in FIG. 2 only with respect to one of the feet although all of the feet are identical).

Radially extending valleys (or straps) 12 are disposed between adjacent pairs of feet 9. These straps 12 each include a valley floor which substantially follows the surface curvature of the underlying hemispherical shape of the base 7 and terminates at and open into an extended portion 13 where the straps 12 meets the sloping wall 11. Although shown in FIG. 2 by solid lines for simplicity at the junctions between the sloping walls 11 and the straps 12 and pads 10, the intersection of these elements are curved in cross-section to provide smooth transitions and structural rigidity of the straps along their length.

The gate area 14 of the base 7, through which extends the axis 8 is connected to each pad 10 by a substantially flat ridge path 15 joined on either side to portions of the sloping walls 11.

The bottle illustrated includes a small annular lip 16 which is primarily present for aesthetic purposes and for label alignment during production. This lip lies adjacent the transition from the sidewall 6 to the base 7.

As shown in FIG. 1, the transition from the extended portion 13 to the gate 14 is a smooth transition with increasing cross-sectional thickness. That is, the thickness at "D1" is less than the thickness at "A" which are both greater in thickness than the base of the present invention as will be discussed hereinafter.

Figure 3:
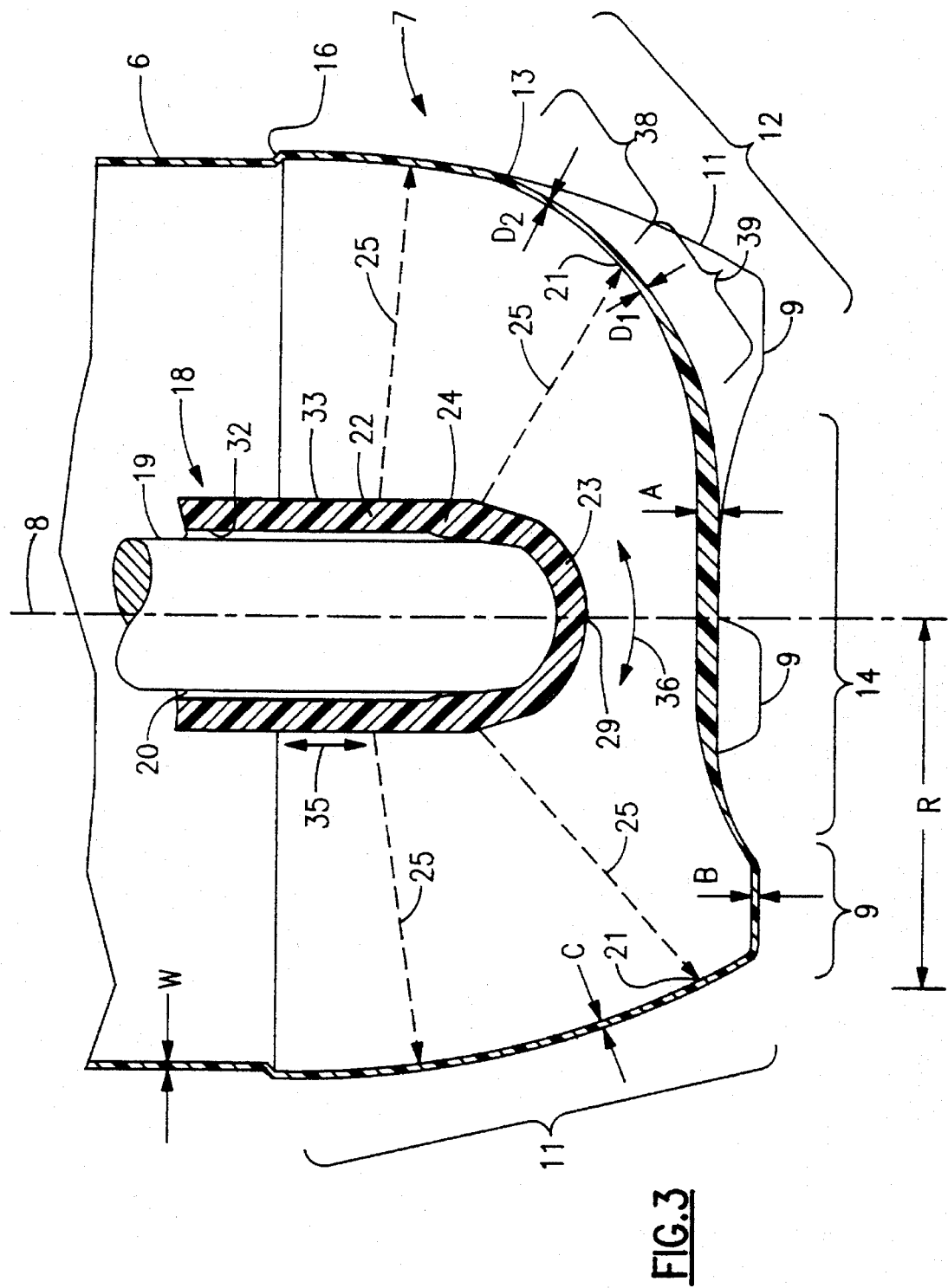
FIG. 3 is a section view of the base of the container of the present invention.
Figure 4:
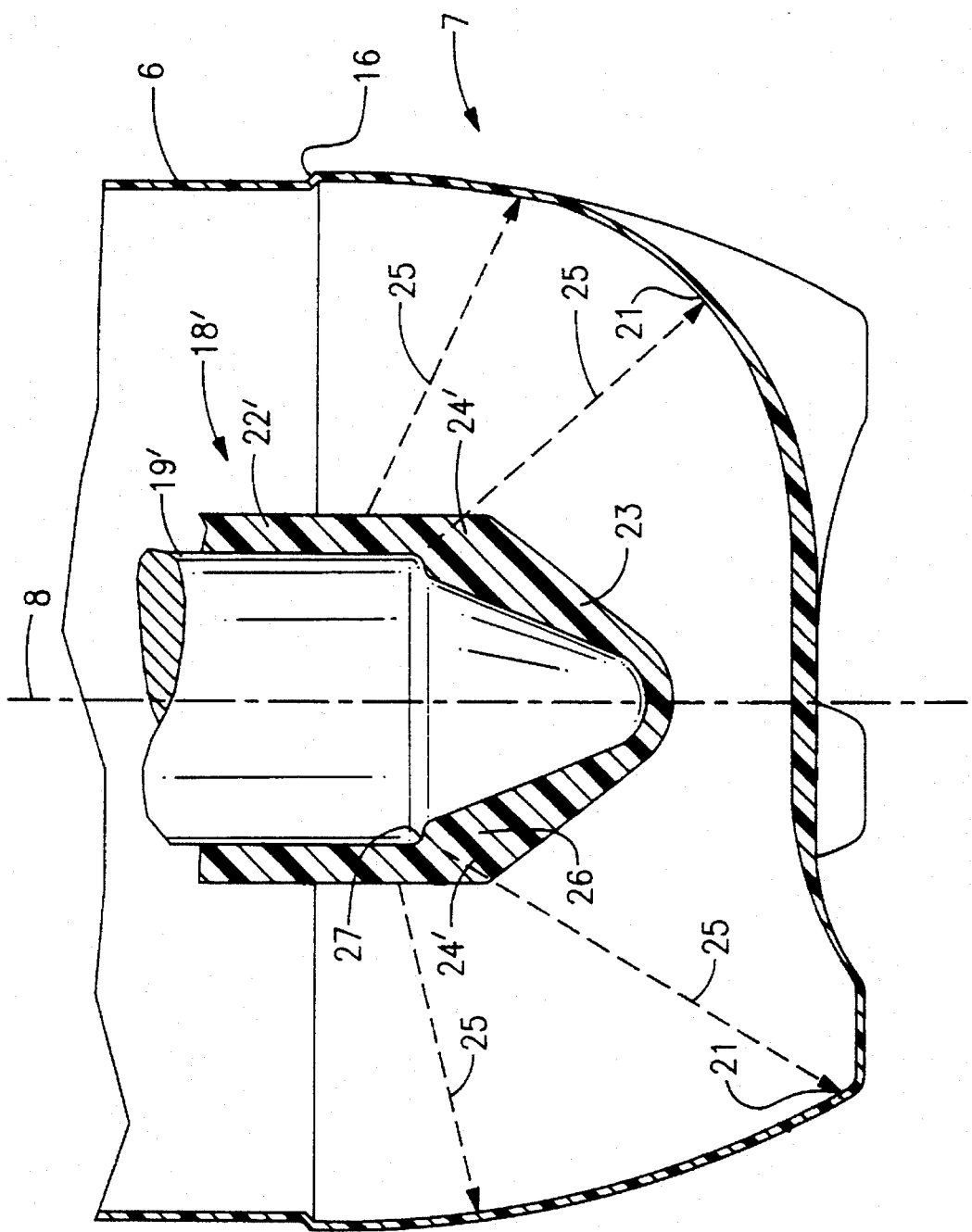
FIG. 4 is a section view of the base of the container of FIG. 3 showing an alternative embodiment of the present invention.

With particular reference to FIGS. 1, 3 and 4 it will be noted that although the bottle is illustrated in cross-sectional form and although the material of the bottle will usually be substantially transparent, details of the interior of the bottle, lying beyond a cross-section taken are omitted for the sake of clarity in the illustration of the invention.

Turning now to FIG. 3, there is shown the petaloid base of the present invention. For convenience, like elements will be referred to with the same reference numerals as those used in FIGS. 1 and 2. FIG. 3 also shows, in cross-section, part of a monobase preform 18. The preform 18, injection molded polyester, typically PET (polyethylene terephthalate), is temperature conditioned and placed in a blow mold over and longitudinally stretched by a stretch rod 19. Pressurized gas is applied within the annular space 20 between the preform 18 and stretch rod 19 to push the walls of the preform 18 outwardly away from the axis 8 so as to expand the preform 18 into a desired finished shape in the blow mold which defines the exterior of that shape.

The preform comprises a neck finish 2, connected to a neck transition portion 3 by way of a neck support ring 4. A sidewall producing portion 22 of the preform extends from the neck transition portion 3 with a substantially constant outside diameter of 1.125 inches, however, both the inner 32 and outer 33 walls of the sidewall forming portion 22 are slightly tapered to facilitate release from the injection mold cavity and core. The thickness of the sidewall forming portion is about 0.145 inches. The sidewall forming portion 22 terminates in a closed base producing portion 23 having a wall thickness, in the gate producing area thereof, of 0.110 inches. The resulting preform 18 is similar in shape to a test tube. However, the transition (reinforcing ring forming portion 24) between the sidewall forming portion 22 and the bottom forming portion 23 has an increased wall thickness of about 0.160 inches. The purpose of the reinforcing ring forming portion 24 will be described hereinafter.

Prior to blow molding the preform 18 to produce the bottle 1, the preform 18 is temperature conditioned with preform 18 being turned about axis 8, during conditioning, so as to receive uniform heat. This temperature conditioning takes place outside the blow mold cavity immediately prior to being positioned in the mold cavity. For simplicity, the neck producing portion (which remains substantially the same) and the mold itself are not shown. The stretch rod 19, being extendable along the longitudinal axis, is pushed downward stretching the preform longitudinally until the bottom 29 of the preform 18 is closely adjacent (but spaced from) the bottom of the cavity. The reinforcing ring forming portion 24 has a wall thickness greater than both the wall thickness of the sidewall forming portion 22 and the bottom forming portion 23 and therefor the reinforcing ring forming portion 24 has a greater mass per unit area and is slightly cooler than the thinner portions of the preform. Due to this and the greater thickness more stretching occurs in the sidewall forming portion 22 and the gate area forming portion 23 than in the relatively cool thicker reinforcing ring forming portion 24. During blow molding, the stretch ratio between the wall thickness of the gate area forming portion 23 and the gate area 14 is about 2:1 whereas the stretch ratio between the sidewall forming portion 22 and the sloping wall 11 is about 12:1. In FIG. 3, the extension of the sidewall forming portion 22 by the stretch rod 19 occurs along axis 8 as shown by arrows 35 whereas arrows 36 show the direction of extension in the bottom forming portion 23 by the stretch rod. The inside diameter of the preform 18 is greater than the outside diameter of the stretch rod 19 whereby an annular space 20 is provided. This space 20 facilitates pressurization of the preform 18 to produce the bottle 1. Also, this space provides for a simply designed stretch rod having no step to accommodate the reinforcing ring forming portion 24 of the preform 18.

Pressurized gas is then introduced within the preform 18 to blow the preform 18 outwardly and downwardly away from the stretch rod to produce the bottle 1. The gas is introduced through the neck so that blow molding proceeds from the top of the bottle 1 adjacent the neck transition to the bottom forming portion 23. The introduction of the gas may commence before the stretch rod has completed the longitudinal extension of the preform.

As is well known by those skilled in the art, preferred performance is obtained in PET containers by providing desired axial and hoop stretching of the material during the blow molding process thus biaxially orienting the material of the container. The above-described control of the temperature conditioning and the stretch rod operation coupled with the blow molding itself provide desired biaxial orientation of the container material together with accurate placement of the reinforcing ring forming portion 24 and gate area forming portion 23 to form the reinforcing petaloid base of the container.

Finally, according to the present invention, since the reinforcing ring forming portion 24 is cooler, material is pulled from bottom forming portion during blowing to increase the stretch and thus the orientation in the gate area 14. This is believed at least in part because as the sidewall forming portion 22 is blown outwardly away from the stretch rod 19, the gate area forming portion 23 is also blown outwardly and downwardly away from the stretch rod 19 while the slightly cooler more massive reinforcing ring forming portion 24 expands at a slower rate such that the reinforcing ring forming portion 24 is laid in the mold last, after the gate area has been formed. Thus, the gate area forming portion 23 is able to expand across the gate area with greater freedom than is available in the absence of the reinforcing ring forming portion 24.

When the blowing is complete, container in the form of a bottle is produced having less weight than prior art petaloid based bottles while maintaining adequate strength to withstand internal pressure from a carbonated beverage. The base of the bottle comprises all of the features of the prior art bottles to facilitate standing. In addition, the base contains the reinforcing ring 21, which defines the transition between an upper strap 38 and lower strap 39 of strap 12 as well as defines the transition between the sloping walls 11 and feet 9.

The preferred preform design for a typical 2 liter bottle is one having the following:

sidewall forming portion 22 wall thickness=X bottom forming portion 23 wall thickness=Y reinforcing ring forming portion 24 wall thickness=Z Y=from 0.6X to Z with a preferred range 0.7X to 0.8X Z=from 1.03X to 1.33X with a preferred range from 1.05X to 1.10X Prior art preforms blown into large or small contact diameters petaloid bases of 2 litter bottles generally have an outside diameter of the sidewall forming portion 22 of 1.125 inches. Typically wall thicknesses of the preform in this portion and at the transition to the base forming portion are:

large contact diameter preform=0.165 inches small contact diameter preform=0.145 inches large contact diameter base typically has a contact diameter of 3.2 inches (R=1.6 inches)

small contact diameter base typically has a contact diameter of 2.8 inches (R=1.4 inches)

Taking the diameter of mid-point of the preform wall thickness (example; 1.125−0.165=0.960) and dividing that number into the base contact diameter provides a stretch ratio for that point as follows.

large contact diameter=3.33=(3.2/(1.125−0.165))

small contact diameter =2.86 =(2.8/(1.125−0.145) )

With the preform of the present invention, a thickened section 21 of material at the point needed in the bottle base, i.e. the foot is provided by the annular reinforcing ring forming portion 24 which is 0.160 inches thick. A typical contact diameter for the bottle of the present invention is about 3.0 inches (R=1.5 inches) thus yielding a stretch ratio in the hoop direction for the reinforcing ring of 3.11=3.0/(1.125−0.160)).

The wall reduction in the foot via hoop orientation only is determined by dividing the wall thickness by the stretch ratio which yields;

typical small contact dia 0.145/2.86=0.051 typical large contact dia 0.165/3.33=0.50 bottle bases of the present invention 0.160/3.11=0.052

As seen from the above, the bottle base of the present invention yields the thickest foot wall which gives more reinforcement at the foot as well as minimizing stress whitening which is an aesthetic defect. The stress whitening is caused by overstretching the material and is common to large contact diameter bottles.

The purpose of the reinforcing ring forming portion which forms the reinforcing ring blown into the bottle base provides several benefits. A one piece bottle needs to be self-standing and withstand the pressure from carbonation (which rises as the bottle is exposed temperatures above room temperature). The base will deform unacceptably if reinforcement is not provided in place of simply using more material. Strength is provided from three aspects; 1) geometric reinforcement of the base design, 2) material strength of the PET, 3) orientation strength imparted to the PET.

The preform used in the present invention has a thickened annular ring 24 to form a reinforcing ring 21 placed into those sections of the base which need reinforcement to permit a weight reduction the container base. Further, orientation of the bottom forming portion of the preform is increased to impart orientation strength in the gate area 14 of the bottle. This area is susceptible to stress cracking the risk of which can be reduced by increasing orientation.

The resulting base of the bottle of the present invention weighs 13.5 grams which is 1.5 grams less than the weight of the small contact diameter base (15 grams) while having a larger contact diameter (3.0 inches vs. 2.8 inches). The weight of the large contact diameter base is 17.5 grams. Thus significant material weight saving is achieved while contact diameter is increased relative to the prior art small contact diameter base and is 93% of that of the much, 4 gram, heavier prior art large contact diameter base.

Table 1 shows the comparison of bottle size, weight and wall thicknesses of prior art small contact diameter and large contact diameter bottles with the bottle of the present invention.

TABLE 1

| Bottle | R (in) | Thickness (in) | | | | | Base Weight (gm) |
| --- | --- | --- | --- | --- | --- | --- | --- |
| | | A | B | C | D1 | D2 | |
| 1 | 1.4 | .087 | .012 | .011 | .051 | .015 | 15 |
| 2 | 1.4 | .077 | .010 | .011 | .035 | .011 | 13.5 |
| 3 | 1.5 | .060 | .014 | .012 | .035 | .013 | 13.5 |
| 4 | 1.6 | .086 | .009 | .013 | .043 | .014 | 17.5 |

Bottle
1 Small diameter prior art base (15 grams)
2 Small diameter prior art base (13.5 grams)
3 Present invention monofoot base (13.5 grams)
4 Large diameter prior art base (17.5 grams)

In testing the prior art preform having the same base weight of the present invention (Bottle 2 in Table 1), it has been discovered that the wall thickness in D2 of 0.011 inches did not provide adequate structural strength to withstand the internal pressure generated by the carbonated beverage. Thus, without the redistribution of the material and the reinforcing ring of the present invention, merely reducing weight is insufficient to obtain a structurally sound bottle.

There are a number of significant advantages of the bottle of the present invention to prior art small contact diameter bottles. The first and most important is the reduction in weight of the base (from 15 grams to 13.5 grams) while having a larger base diameter (from 2.8 inches to 3.0 inches). Second, more material is provided in the foot 9 at "B" (from 0.008 to 0.14 inches thick) so that there exists less potential for stress whitening, thereby providing a more aesthetically pleasing bottle. This added material also provides a stronger foot. Third, the gate area 14 at "A" is thinner (from 0.087 inches to 0.060 inches) while maintaining adequate strength. As previously discussed, the thickness at "A" can be reduced because greater stretching occurs in bottom forming portion 23 to increase orientation thereby increasing strength coupled with lighter weight. Prior art bottles had less stretching in this area and thus required a greater thickness to maintain adequate strength and reduce stress cracking. Fourth, the amount of stretching during blowing at "D1" and "D2" is more than in the prior art bottles (compare Bottle 1 with Bottle 3). The redistribution of the material and the reinforcing ring allow this to occur without sacrificing bottle integrity.

The overall reduction in weight of the base from a prior art large contact diameter base (17.5 grams to 13.5 grams) while maintaining more than 93% of the contact diameter (3.0/3.2) is accomplished by placing the reinforcing ring 21 in areas of the base to provide the most resistance to deformation, i.e. the strap 12 and feet 9, while reducing material thickness and increasing orientation in the gate area 14.

It is preferable for changes in thickness in the preform to be gradual. It will be appreciated that the actual shape of the preform may differ from that illustrated herein providing the concepts set forth are followed. Further, it should be noted that the gate area forming portion could be as thick as the reinforcing ring forming portion.

In an alternative embodiment (FIG. 4), a monobase preform 18' having an annular nub 26 is engaged by a mating annular groove 27 in the end of the stretch rod 19'. This preform is of the type disclosed in the inventor's own U.S. Pat. Nos. (4,780,257; 4,889,752; and 4,927,679), which may be used in the present invention to provide a bottle with a petaloid base rather than a champagne base to which those patents relate. The resulting bottle will contain the reinforcing ring 21, produced by the reinforcing ring forming portion 24' and bottom forming portion 23' of the preform 18'.

Figure 5:
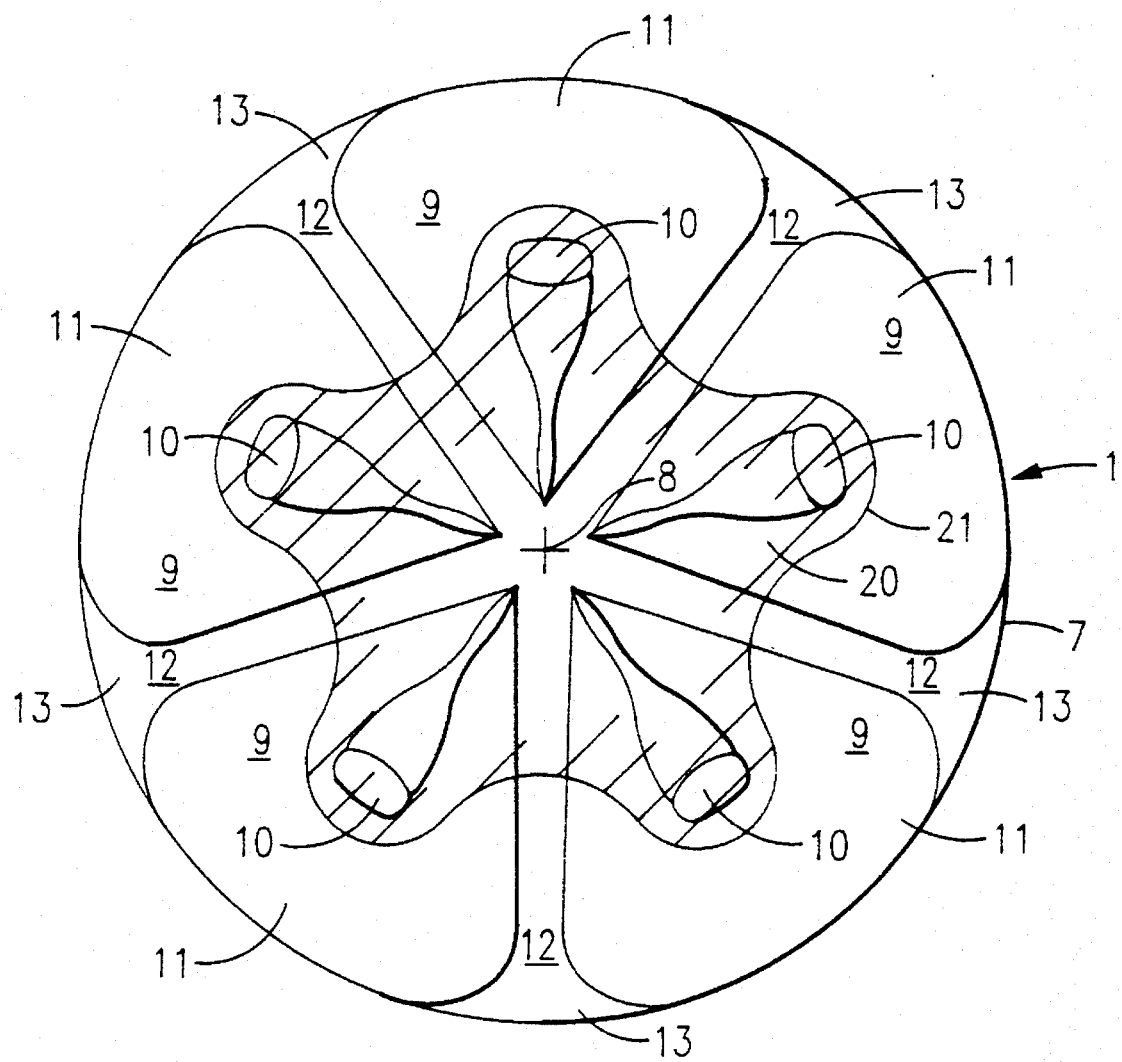
FIG. 5 is a bottom view of the present invention.

Turning now to FIG. 5, there is shown the bottom view of the base of the present invention showing the reinforcing ring 21 extending circumferentially around the base and following the curves and slopes through the straps 12 and sloping walls 11.

What is claimed is:

1. A blow molding process for producing a self-standing one-piece polyester container for carbonated beverages defining a longitudinal axis and comprising a sidewall portion which is integral with and terminates in a closed base portion of a petaloid form defining at least three feet disposed about the longitudinal axis whereby the container is self standing, each said foot being defined by: i) a support pad; ii) a sloping outer wall extending generally upwardly from a radially outward extremity of the support pad to the sidewall portion; iii) sloping lateral walls extending generally upwardly from radially extending extremities of the support pad to radially extending straps disposed between adjacent pairs of feet, each said strap extending from a gate area, centered on said longitudinal axis, along a curve to said sidewall portion; iv) a sloping inner wall extending from a radially inner extremity of the support pad to the gate area; and, v) a reinforcing ring located on said curve between said gate area and said sidewall portion, in a transition between said support pad and said sloping outer wall, and extending circumferentially around said base portion through said feet, said lateral sloping walls and said straps, the method comprising the steps of:

a) forming a hollow preform comprising a sidewall forming portion of constant wall thickness material along the length of the sidewall forming portion, for forming a constant thickness sidewall portion of the container, and terminating, in a closed base forming portion, a reinforcing ring forming portion being located at a transition between the sidewall forming portion and the base forming portion, said reinforcing ring forming portion having a wall thickness greater than the wall thickness in the sidewall forming portion and greater than a wall thickness in the base forming portion;

b) temperature conditioning the preform;

c) positioning the preform in a blow mold cavity defining the finished container shape and having a neck finish engaging top and a base forming bottom;

d) inserting a stretch rod into the preform;

e) extending the stretch rod within the cavity to move the bottom of the preform toward the bottom of the blow mold cavity to longitudinally stretch the material in at least the sidewall forming portion such that the preform extends from the top to adjacent the bottom of the blow mold cavity; and, f) injecting pressurized gas into the preform whereby the preform is radially stretched outwardly to fill the blow mold cavity to form the container with the material of the reinforcing ring located in the transitions between said support pads and said sloping outer walls, extending circumferentially around said base portion through said feet, said sloping lateral walls and said straps, and not extending radially inwardly through the feet to transitions between the sloping inner walls and the gate area, and the gate area and the transitions between the sloping inner walls and the gate area both having wall thicknesses that are less than the wall thicknesses in corresponding portions of the preform.

2. The method according to claim 1 further comprising the step of providing a reinforcing ring forming portion having a wall thickness in the range from about 1.03 to 1.33 times the thickness of said sidewall forming portion.

3. The method according to claim 2 wherein the step of forming the preform comprises the step of providing the base forming portion with a wall thickness in the range from about 0.6 times the thickness of said sidewall forming portion to about 1.0 times the thickness of said reinforcing ring forming portion.

4. The method according to claim 1 wherein the step of forming the preform comprises the step of providing the base forming portion with a wall thickness equal to or less than the thickness of the sidewall forming portion.

5. The method according to claim 1 wherein the step of forming the preform comprises the step of providing the base forming portion with a wall thickness approximately 0.6 to 0.8 times the thickness of the sidewall forming portion.

6. The method according to claim 5 wherein the step of forming the preform comprises the step of providing the base forming portion with a wall thickness about 0.7 to about 0.8 times the thickness of the sidewall forming portion.

7. The method according to claim 3 wherein the step of forming the preform comprises the step of providing the base forming portion with a wall thickness about 0.7 to about 0.8 times the thickness of the sidewall forming portion.

8. The method according to claim 1, wherein the step of injecting pressurized gas into the preform comprises stretching the base forming portion of the preform, whereby the gate area has a wall thickness of about 0.06 inches.

9. The method according to claim 3, wherein the step of injecting pressurized gas into the preform comprises stretching the base forming portion of the preform, whereby the gate area has a wall thickness of about 0.06 inches.

10. The method according to claim 1, wherein the step of forming the preform comprises forming the base forming portion with a wall thickness of about 0.11 inches, the reinforcing ring forming portion with a wall thickness of about 0.16 inches and the sidewall forming portion with a wall thickness of about 0.145 inches.

* * * * *